United States Patent
Czerny et al.

(10) Patent No.: US 10,601,219 B2
(45) Date of Patent: Mar. 24, 2020

(54) METHOD FOR CONTROLLING A DRIVE

(71) Applicant: Siemens Aktiengesellschaft, Munich (DE)

(72) Inventors: Werner Czerny, Hoechstadt (DE); Reinhold Goetz, Herzogenaurach (DE); Andreas Heilmann, Pinzberg (DE); Jan Kabus, Chemnitz (DE); Stefan Ingo Meier, Erlangen (DE); Martin Meinardus, Nuremberg (DE); Christian Merkel, Erlangen (DE); Juergen Mielke, Bamberg (DE); Luliu Vlaic, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 209 days.

(21) Appl. No.: 15/644,032

(22) Filed: Jul. 7, 2017

(65) Prior Publication Data
US 2018/0019586 A1    Jan. 18, 2018

(30) Foreign Application Priority Data
Jul. 13, 2016    (EP) .................................. 16179279

(51) Int. Cl.
*H02H 7/08* (2006.01)
*G05B 9/02* (2006.01)
(Continued)

(52) U.S. Cl.
CPC .......... *H02H 7/0844* (2013.01); *F16H 61/12* (2013.01); *G05B 9/02* (2013.01); *G05B 19/0425* (2013.01); *G05B 19/0428* (2013.01); *H02P 29/00* (2013.01); *H02P 29/032* (2016.02); *G05B 2219/20* (2013.01); *G05B 2219/24008* (2013.01); *G05B 2219/24188* (2013.01)

(58) Field of Classification Search
CPC ............................... H02H 7/0844; G05B 9/02
USPC ........................................................ 318/3, 34
See application file for complete search history.

(56) References Cited

U.S. PATENT DOCUMENTS 5,304,912 A * 4/1994 Kajiwara ................ B60L 3/003
                                                              318/802
5,744,923 A * 4/1998 Strauss .................... G05B 9/02
                                                              318/430

(Continued)

FOREIGN PATENT DOCUMENTS

CN    200986287 Y    12/2007
CN    202735763 U    2/2013

(Continued)

OTHER PUBLICATIONS

Office Action dated Jun. 20, 2019 issued in Chinese Patent Application No. 201710546188.3.

(Continued)

*Primary Examiner* — David Luo
(74) *Attorney, Agent, or Firm* — Cozen O'Connor

(57) ABSTRACT

A method for controlling a drive having at least one converter, at least one motor and an assigned drive control, wherein a failsafe CPU is operated separately from the drive control and only processes safety-relevant information, where a number of safety functions are implemented by the failsafe CPU such that the safety-relevant functions of the drive are implemented in a simple and reliable manner.

5 Claims, 2 Drawing Sheets

(51) Int. Cl.
   *H02P 29/032*    (2016.01)
   *F16H 61/12*     (2010.01)
   *H02P 29/00*     (2016.01)
   *G05B 19/042*    (2006.01)

(56) References Cited

U.S. PATENT DOCUMENTS 5,757,147 A       5/1998   Blumor et al.
9,654,032 B2 *    5/2017   Barrass .................. H02P 7/298

FOREIGN PATENT DOCUMENTS

| CN | 202856687 U | 4/2013 |
| CN | 204607304 U | 9/2015 |
| DE | 19520642 | 12/1996 |
| DE | 102010051413 | 5/2012 |
| EP | 2927762 | 10/2015 |
| WO | WO 2015/145562 | 10/2015 |

OTHER PUBLICATIONS

Office Action dated Dec. 5, 2019 issued in Chinese Patent Application No. 201710546188.3.

* cited by examiner

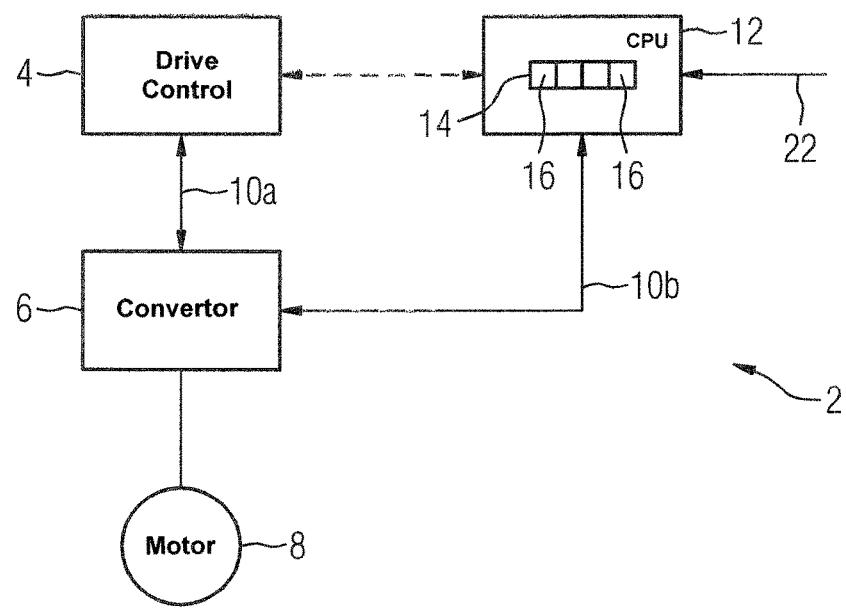
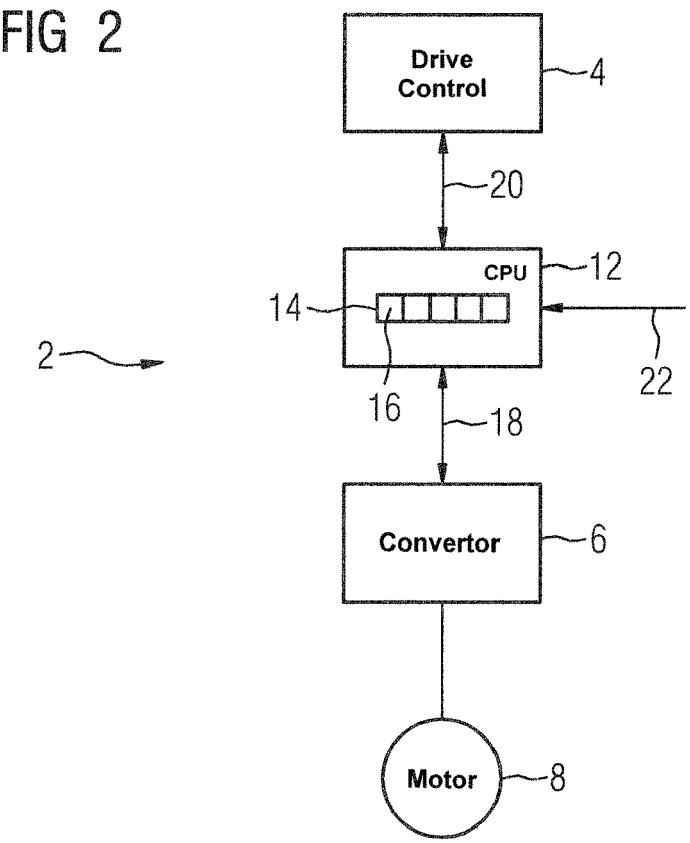

METHOD FOR CONTROLLING A DRIVE

BACKGROUND OF THE INVENTION

1. Field of the Invention

The invention relates to a method for controlling a drive having at least one converter, at least one motor and an assigned drive control and also relates to a system comprising at least one converter, at least one motor and an assigned drive control.

2. Description of the Related Art

High statutory safety standards exist in Europe particularly for multi-motor drive systems in paper-making machines. There is a demand for safety functions, such as prestart warning, safeguarding against unexpected start-up, emergency stop, speed check for design and creep rate and a safety-related inching mode, in which a slow drive speed is active while a control button is actuated.

The implementation of all afore-cited safety functions using many safety hardware components (e.g., what are known as E-stop relays, speed monitors, safety relays) is very complex. Moreover, a large additional configuration, cabling and commissioning outlay is associated therewith. In such cases, the diagnosis in the case of faults requires an extremely complicated fault diagnosis.

SUMMARY OF THE INVENTION

In view of the foregoing, it is an object of the invention to provide a method that permits a simple and reliable implementation of the safety-relevant functions of a drive.

This and other objects and advantages are achieved in accordance with the invention by a method for controlling a drive having at least one converter, at least one motor and an assigned drive control, where a failsafe CPU is provided that is operated separately from the drive control and only processes safety-relevant information, and where a number of safety functions are implemented by the failsafe CPU.

It is also an object of the invention to provide a system comprising at least one converter, at least one motor, an assigned drive control and a failsafe CPU that is separated from the drive control and which only processes safety-relevant information, where the failsafe CPU has at least one safety program for implementing the method in accordance with the invention.

The invention is based on the idea that a particularly simple embodiment of the safety-relevant functions of a drive is possible, by a failsafe CPU taking over a number of, in particular all, safety functions for the drive. With respect to an improved diagnosis capability, simpler fault diagnosis and a quicker commissioning, the safety functions of the drive are bundled into one single CPU. This failsafe CPU serves as a supplement to the drive with a conventional drive control which has no safety program. No additional safety hardware in particular is thus required. The individual safety functions are combined at this location into a safety program, which is implemented by the failsafe CPU. The failsafe CPU is decoupled from the drive control, as a result of which a particularly simple retrofitting of existing drives with their own drive control is possible by the additional failsafe CPU.

A multi-motor drive is preferably controlled via the failsafe CPU. Actuation of multi-motor drive systems is generally very complex, their safety control is correspondingly complex, and therefore use of the failsafe CPU lends itself to multi-motor drive systems.

In accordance with a preferred embodiment, the drive control and the failsafe CPU each communicate with the converter over a communication interface. Here, the drive control communicates with the converter via a field bus system in particular, and the failsafe CPU communicates with the converter via a separate field bus system or via a separate data line for digital signals.

In accordance with an alternative embodiment, only the failsafe CPU communicates with the converter over the communication interface. The failsafe CPU is, in this case, connected between the drive control and the converter such that only the failsafe CPU has a direct communication interface with the converter that is formed in particular as a field bus system. Here, in addition to all safety functions for the drive, the failsafe CPU also serves as a "Gateway" for "passing through" the commands to the drive and the feedback from the drive to the drive control.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the invention is explained in more detail on the basis of a drawing, in which, shown in a schematic representation in which:

FIG. 1 shows a first embodiment of a system with a failsafe CPU in accordance with the invention;

FIG. 2 shows a second embodiment of a system with a failsafe CPU in accordance with the invention.

DETAILED DESCRIPTION OF THE EXEMPLARY EMBODIMENTS

Figure 3:
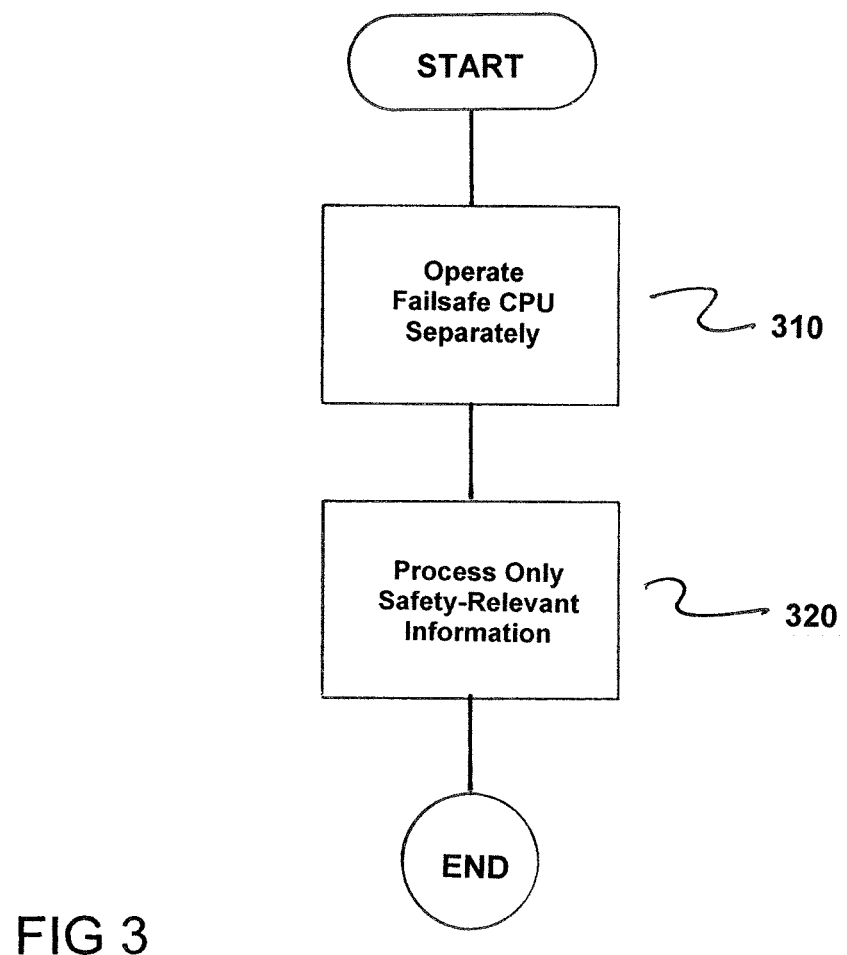
FIG. 3 is a flowchart of the method in accordance with the invention.

The same reference characters have the same meaning in the figures.

A system 2 which is part of a drive (not shown in more detail here) is shown in FIG. 1. The system 2 comprises a drive control 4, a converter 6, which is a frequency converter here, and a motor 8, where the converter 6 and the motor 8 are representative of a number of converters and motors if the drive is a multi-motor drive. The drive control 4 is connected in a DP-related manner to the frequency converter 6 via a field bus system 10a, such that target values, actual values, commands and/or status information are exchanged between the drive control 4 and the frequency converter 6. The frequency converter 6 feeds power to the motor 8.

The system 2 also comprises a failsafe CPU 12, which communicates with the frequency converter 6 via a second field bus system 10b or via a data line for digital signals. The failsafe CPU 12 processes safety-relevant signals, which are supplied by, e.g., emergency stop buttons, safety switches, inching commands, or monitors, via one or a number of lines or a field bus system 22. Instead of a line 22, a wireless transmission such as via WLAN can also occur. The failsafe CPU 12 has a safety program 14, which contains a number, in particular all safety functions 16 required for the safe operation of the drive control. Safety functions 16 in this sense are, for instance, a prestart warning, a safeguarding against unexpected start-up, emergency stop, speed monitoring for design and creep rate and a safety-related inching mode.

The frequency converter 6 is actuated with respect to the safety function 16 via the second field bus system 10*b*. Actual values and/or status information can also be supplied to the failsafe CPU 12 from frequency converter 6 via the second field bus system 10*b*.

An alternative embodiment of the system 2 is shown in FIG. 2. The major difference from the embodiment of FIG. 1 consists in only the failsafe CPU 12 communicating directly with the frequency converter 6 via a field bus system 18. In the presently contemplated embodiment, the failsafe CPU 12 serves as a "gateway" for forwarding the values and commands of the drive control 4 to the frequency converter 6, which receives these values and commands via a data line 20. In addition, the failsafe CPU 12 is supplied with the safety-relevant signals via the line 22, which are assigned to the individual safety functions 16 in the safety program 14 and processed.

FIG. 3 is a flowchart of the method for controlling a drive having at least one converter 6, at least one motor 8 and an associated drive control 4. The method comprises operating a failsafe CPU 12 separately from the associated drive control 4, as indicated in step 310. Next, only safety-relevant information is processed by the failsafe CPU 12, as indicated in step 320. In accordance with the invention, a plurality of safety functions 16 are implemented by the failsafe CPU 12.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a drive within a multi-drive system of a paper-making machine, said drive having at least one converter, at least one motor and an associated drive control, comprising:

operating a failsafe CPU separately from the associated drive control of the drive within the multi-drive system of the paper-making machine, said failsafe CPU communicating directly with at least one frequency converter via a communication interface; and processing only safety-relevant information by the failsafe CPU; wherein a plurality of safety functions are implemented by the failsafe CPU.

2. The method as claimed in claim 1, wherein a multi-motor drive is controlled via the failsafe CPU.

3. The method as claimed in claim 1, wherein the associated drive control of the drive within the multi-drive system of the paper-making machine and the failsafe CPU each communicate with the converter over a communication interface.

4. The method as claimed in claim 1, wherein only the failsafe CPU communicates with the converter over the communication interface.

5. A multi-drive system of a paper-making machine comprising:

at least one frequency converter;
a communication interface;
at least one motor;
an assigned drive control of a drive within the multi-drive system of the paper-making machine; and a failsafe CPU separated from the assigned drive control of the drive within the multi-drive system of the paper-making machine and communicating directly with said at least one frequency converter via the communication interface, and said failsafe CPU only processing safety-relevant information; wherein the failsafe CPU includes at least one safety program which causes operation the failsafe CPU separately from the assigned drive control of the drive within the multi-drive system of the paper-making machine and causes the processing of only the safety-relevant information at the failsafe CPU.

\* \* \* \* \*